United States Patent
Sato et al.

(10) Patent No.: US 8,564,975 B2
(45) Date of Patent: Oct. 22, 2013

(54) AC-DC CONVERTER

(75) Inventors: Makoto Sato, Shimoakasaka (JP);
Mitsutaka Sato, Shimoakasaka (JP)

(73) Assignee: Sanken Electric Co., Ltd. (JP)

( * ) Notice: Subject to any disclaimer, the term of this patent is extended or adjusted under 35 U.S.C. 154(b) by 208 days.

(21) Appl. No.: 12/663,842

(22) PCT Filed: Mar. 12, 2008

(86) PCT No.: PCT/JP2008/054467
§ 371 (c)(1),
(2), (4) Date: Dec. 10, 2009

(87) PCT Pub. No.: WO2008/152838
PCT Pub. Date: Dec. 18, 2008

(65) Prior Publication Data
US 2010/0188874 A1    Jul. 29, 2010

(30) Foreign Application Priority Data
Jun. 14, 2007 (JP) ................... 2007-157936

(51) Int. Cl.
*H02M 3/335* (2006.01)
(52) U.S. Cl.
USPC .............. 363/20; 363/21.08; 363/21.16
(58) Field of Classification Search
USPC .......... 363/20, 21.01, 21.07, 21.08, 21.12, 363/21.15, 21.16, 21.18, 89, 97
See application file for complete search history.

(56) References Cited

U.S. PATENT DOCUMENTS 5,440,473 A * 8/1995 Ishii et al. .............. 363/21.05
2005/0269997 A1* 12/2005 Usui et al. .............. 323/207

FOREIGN PATENT DOCUMENTS

| JP | 3007066 | 1/1991 |
| JP | 7135774 | 5/1995 |
| JP | 10210748 | 8/1998 |
| JP | 11502100 | 2/1999 |
| JP | 2003199346 | 7/2003 |

OTHER PUBLICATIONS

Priority Document JP2007-157936 filed Jun. 14, 2007 received by International Bureau Apr. 24, 2008.
Form PCT/IB/304 for PCT/JP2008/054467.
Form PCT/ISA/237 for PCT/JP2008/054467.
Form PCT/ISA/210 for PCT/JP2008/054467.
Form PCT/ISA/220 for PCT/JP2008/054467.
Publication WO/2008/152838.

* cited by examiner

*Primary Examiner* — Adolf Berhane
*Assistant Examiner* — Gustavo Rosario Benitez
(74) *Attorney, Agent, or Firm* — James Faier; Martin Faier; Faier & Faier P.C.

(57) ABSTRACT

AC-DC converter is provided which comprises an auxiliary winding 8c in a transformer 8, a voltage detector 21 for detecting a voltage $V_N$ appearing on auxiliary winding 8c of transformer 8 by on-off operation of a main switching element 9 in a DC-DC converter 10 to produce an output signal $V_{CP1}$ when voltage $V_N$ on auxiliary winding 8c has a negative polarity, a waveform shaper 23 for generating chopping signals $V_{RC}$ from output signal $V_{CP1}$ of voltage detector 21, and a PWM circuit 27 for comparing output voltage $V_{RC}$ from waveform shaper 23 and output voltage $V_{CH}$ from a boosting chopper 3 to supply drive signals $V_{G1}$ to step-up switching element 5 in boosting chopper 3 when output voltage $V_{RC}$ from waveform shaper 23 exceeds output voltage $V_{CH}$ from boosting chopper 3. While controlling fluctuation in output voltage from boosting chopper with respect to fluctuation in AC input voltage, the converter can improve input power factor relative to AC voltage and also reduce consumption power during light load period.

4 Claims, 6 Drawing Sheets

US 8,564,975 B2

AC-DC CONVERTER

TECHNICAL FIELD IN INDUSTRY

This application is a U.S. national phase submission of Patent Cooperation Treaty PCT/JP2008/054467 under 35 U.S.C. 371 based on Japanese Patent Application No. 2007-157936 filed 14 Jun. 2007. This invention relates to an AC-DC converter of the type capable of improving the input power factor relative to AC voltage and also reducing the consumption power during light load period while controlling fluctuation in output voltage from a boosting chopper circuit under variation in AC input voltage.

PRIOR ART

AC-DC converters have been widely used in the past which comprises a rectification circuit for commutating AC voltage from an AC power source, a DC-DC converter for producing a DC voltage from an output voltage of the rectification circuit through a transformer and a rectification smoothing circuit by on-off operation of a switching element, and a boosting chopper circuit connected between the rectification circuit and DC-DC converter to improve input power factor. For example, FIG. 6 shows a prior art AC-DC converter which comprises a rectification circuit 2 of diode-bridge type for commutating AC input voltage $E_A$ from an AC power source 1; a boosting chopper circuit (boosting chopper) 3 for increasing rectified output voltage $V_{RF}$ from rectification circuit 2 by on-off operation of a boosting MOS-FET 5 as a step-up switching element connected to rectification circuit 2; and a DC-DC converting circuit (DC-DC converter) 10 connected to an intensifier capacitor 7 in boosting chopper 3 for supplying DC output of voltage Eo to a load 14 through a transformer 8 and a rectification smoothing circuit (rectification smoother) 11 by on-off operation of a main MOS-FET 9 as a main switching element.

Boosting chopper 3 comprises a reactor 4 which has one end connected to one output terminal of rectification circuit 2, a boosting MOS-FET 5 connected between the other end of reactor 4 and the other output terminal of rectification circuit 2, a rectification diode 6 which has its anode terminal connected to a junction between reactor 4 and boosting MOS-FET 5, an intensifier capacitor 7 connected between a cathode terminal of rectification diode 6 and the other output terminal of rectification circuit 2, and a current detection resistor 17 connected in series to a source terminal of boosting MOS-FET 5 for detecting an intensified current $I_{Q1}$ through boosting MOS-FET 5 as a sensed voltage $V_{DT}$. A chopper control circuit 50 supplies first drive signals $V_{G1}$ to a gate terminal of boosting MOS-FET 5 to turn it on and off and thereby induce on opposite ends of intensifier capacitor 7 a DC voltage $V_{CH}$ higher than rectified output voltage $V_{RF}$ from rectification circuit 2. A parasitic diode 5a is connected between drain-source terminals of boosting MOS-FET 5.

Chopper control circuit 50 comprises an output voltage detecting circuit (output voltage detector) 51 for producing error signals $V_{ER}$, the differential between DC voltage $V_{CH}$ from intensifier capacitor 7 and reference voltage from a normal power supply (not shown in the drawings), a phase compensating circuit (phase compensator) 52 for retarding rising or trailing edge of error signal $V_{ER}$ from output voltage detecting circuit 51, an input voltage detecting circuit (input voltage detector) 53 for detecting rectified output voltage $V_{RF}$ from rectification circuit 2 to produce an input voltage signal $V_{RV}$ corresponding to an instantaneous value of AC input voltage $E_A$, a multiplier 54 for producing to an inverted input terminal of comparator 56 a multiplication signal $V_{MX}$ of output signal $V_{PC}$ from phase compensator 52 and input voltage signal $V_{RV}$ from input voltage detector 53, a current detecting circuit (current detector) 55 for detecting a voltage $V_{DT}$ applied on current detecting resistor 17 to produce an input current signal $V_{CU}$, a comparator 56 for comparing multiplication signal $V_{MX}$ from multiplier 54 at the inverted input terminal with input current signal $V_{CU}$ from current detector 55 at the non-inverted input terminal to produce an output signal $V_{CP}$ of high voltage level when input current signal $V_{CU}$ from current detecting circuit 55 comes to a voltage level $V_{MX}$ of multiplication signal, an oscillator 57 for producing pulse signals $V_{OS}$ of constant cycle, and a drive circuit (driver) 58 for receiving pulse signal $V_{OS}$ from oscillator 57 and output signal $V_{CP}$ from comparator 56 to produce a first drive signal $V_{G1}$ of high voltage level when receiving pulse signal $V_{OS}$ from oscillator 57. Driver 58 maintains first drive signal $V_{G1}$ at high voltage level until receiving output signal $V_{CP}$ of high voltage level from comparator 56, and switches first drive signal $V_{G1}$ from high to low voltage level upon receiving output signal $V_{CP}$ of high voltage level from comparator 56, but shifts it from low to high voltage level when again receiving pulse signal $V_{OS}$ from oscillator 57.

DC-DC converter 10 comprises a primary winding 8a of a transformer 8 and a main MOS-FET 9 connected in series to intensifier capacitor 7 in boosting chopper circuit 3, a voltage-resonant capacitor 18 connected in parallel to main MOS-FET 9, a rectifying smoothing circuit (rectification smoother) 11 comprised of an output rectification diode 12 and output smoothing capacitor 13 connected between a secondary winding 8b of transformer 8 and a load 14, an error amplifier 15 for comparing DC output voltage Eo applied on load 14 through rectification smoother 11 and a reference voltage from a normal power supply not shown to produce an amplified differential or error signal $V_{E2}$ therebetween, and a main control circuit 16 for producing to a gate terminal of main MOS-FET 9 second drive signals $V_{G2}$ of their pulse width corresponding to the voltage level in amplified error signal $V_{E2}$ from error amplifier 15. During turning-on period of main MOS-FET 9, winding current $I_{Q2}$ flows through primary winding 8a of transformer 8 to accumulate electric energy in transformer 8, and when main MOS-FET 9 is turned from on to off, accumulated energy in transformer 8 causes electric current to flow from secondary winding 8b of transformer 8 through output rectification diode 12 in rectification smoother 11 to output smoothing capacitor 13, at the same time, supplying DC output of generally constant voltage Eo through rectification smoother 11 to load 14. Also, when main MOS-FET 9 is turned from on to off, an excitation inductance not shown in transformer 8 and voltage resonant capacitor 18 perform a resonance action together which causes a voltage of sinusoidal rising edge between drain-source terminals of main MOS-FET 9 for zero voltage switching (ZVS) thereof. Another parasitic diode 9a is connected between drain-source terminals of main MOS-FET 9.

In AC-DC converter shown in FIG. 6, chopper control circuit 50 produces first drive signals $V_{G1}$ to boosting MOS-FET 5 in boosting chopper 3 to turn boosting MOS-FET 5 on and off. In this case, when AC input voltage $E_A$ from AC power source 1 has lower and higher instantaneous values, intensified current $I_{Q1}$ through boosting MOS-FET 5 becomes respectively smaller and greater. Here, as AC input current $I_A$ becomes equal to an average value of intensified current $I_{Q1}$ through boosting MOS-FET 5, AC input current $I_A$ changes in proportion to the instantaneous value of AC input voltage $E_A$ to thereby expand conduction interval or angle of AC input current $I_A$, and cause a waveform of AC input current $I_A$ to become generally similar to that of AC input voltage $E_A$ as shown by solid lines in FIG. 7. Thereby, AC input voltage $E_A$ and AC input current $I_A$ get in phase each other for the improved input power factor of approximately 1. FIG. 7 shows an AC input current $I_{AO}$ that passes from AC power source (1) through a rectification circuit of capacitor-input type not shown.

However, prior art AC-DC converter shown in FIG. 6 disadvantageously has some defects because it needs to have complicated chopper control circuit 50 and large-sized reactor 4 to deliver a large amount of intensified current $I_{Q1}$ through reactor 4 and boosting MOS-FET 5 turned on and off with concomitant power loss.

To overcome such detects, Patent Document 1 as below provides an AC-DC converter which advantageously has a control circuit of a more simplified configuration than that of chopper control circuit 50 shown in FIG. 6 because the control circuit may involve a boosting chopper circuit comprised of PWM circuit, one-shot multi-vibrator, pulse synthesizing circuit and comparator. Specifically, the proposed AC-DC converter comprises a rectifier, a boosting chopper circuit and a DC-DC converter, and further comprises a PWM circuit for producing a first pulse signal, one-shot multi-vibrator for producing a delayed pulse, a pulse synthesizing circuit for producing a second signal of pulse width narrower than that of first pulse signal by width of delayed pulse, and a comparator for comparing a raised voltage built up by boosting chopper circuit with a reference voltage to stop occurrence of delayed pulse when boosting chopper circuit produces an output voltage lower than reference voltage. In other words, PWM circuit produces on-pulse signals to DC-DC converter; one-shot multi-vibrator produces a delayed pulse signal of a given width; pulse synthesizing circuit synthesizes on-pulse signals from PWM circuit and delayed pulse signals from one-shot multi-vibrator to produce modified on-pulse signals of narrower width than the original on-pulse width by given pulse width from one-shot multi-vibrator; and the modified on-pulse signal is used to turn on a second switching transistor in boosting chopper circuit. More preferably, the AC-DC converter can control increase in output voltage from boosting chopper circuit during light load period by turning second switching transistor on by means of on-pulse signals of narrower width by given width determined by one-shot multi-vibrator.

[Patent Document 1] Japanese Patent Disclosure No. 7-135774

By the way, AC-DC converter shown in Patent Document 1 has a feature in that on-pulse width of second switching transistor is varied depending on irregular on-pulse width of first switching transistor because second switching transistor in boosting chopper circuit is turned on by on-pulse signal of narrower width than that of first switching transistor by given width produced in one-shot multi-vibrator. Accordingly, in response to fluctuation in input voltage from AC power source, boosting chopper circuit produces fluctuated output voltage so that AC-DC converter disadvantageously produces an unstable output voltage. Widely fluctuating output voltages produced from boosting chopper circuit expands the control range of on-off period of first switching transistor in DC-DC converter by fluctuated component in output voltage of boosting chopper circuit while provoking an increased power loss by first switching transistor and a large-sized transformer. Also, when boosting chopper circuit produces an output voltage lower than reference voltage within comparator under the light load condition, comparator produces an output signal which makes one-shot multi-vibrator stop producing relayed pulse, and generally simultaneously drives first and second switching transistors, and therefore, the converter still has a trouble because it increases power loss during light load period.

Accordingly, an object of the present invention is to provide an AC-DC converter of a simplified circuit configuration capable of improving input power factor for AC voltage and simultaneously reducing power loss during light load period while curbing fluctuation in output voltage of boosting chopper circuit under irregular AC input voltage.

MEANS FOR SOLVING THE PROBLEM

The AC-DC converter according to the present invention comprises a rectification circuit (2) for commutating an AC voltage from an AC power source (1), a boosting chopper circuit (3) connected to rectification circuit (2), and a DC-DC converter (10) connected to boosting chopper circuit (3). Boosting chopper circuit (3) comprises at least a reactor (4), a step-up switching element (5) and a capacitor (7) to increase output voltage from rectification circuit (2) by on-off operation of step-up switching element (5). DC-DC converter (10) comprises a primary winding (8a) of a transformer (8) and at least one main switching element (9) to produce a DC voltage ($E_O$) through a rectification smoother (11) from a secondary winding (8b) of transformer (8) by on-off operation of main switching element (9). The converter further comprises a voltage detecting circuit (21) for detecting a voltage ($V_N$) appearing on any winding of transformer (8) by on-off operation of main switching element (9) in DC-DC converter (10) to produce an output signal ($V_{CP1}$) when the voltage ($V_N$) on any winding has one polarity, a waveform shaper (23) for generating chopping signals ($V_{RC}$) from output signal ($V_{CP1}$) of voltage detecting circuit (21), and a PWM circuit (27) for comparing output voltage ($V_{RC}$) from waveform shaper (23) and output voltage ($V_{CH}$) from boosting chopper circuit (3) to supply drive signals ($V_{G1}$) to step-up switching element (5) in boosting chopper circuit (3) when output voltage ($V_{RC}$) from waveform shaper (23) exceeds output voltage ($V_{CH}$) from boosting chopper circuit (3).

Waveform shaper (23) generates a triangular or chopping signal from output signal ($V_{CP1}$) of voltage detecting circuit (21), and PWM circuit (27) compares voltage ($V_{RC}$) of triangular signal with output signal ($V_{CH}$) of boosting chopper circuit (3). In this case, when output voltage ($V_{CH}$) of boosting chopper circuit (3) is higher than voltage ($V_{RC}$), PWM circuit (27) produces drive signal ($V_{G1}$) of narrower on-pulse width to shorten on-period of step-up switching element (5), thereby lowering output voltage ($V_{CH}$) of boosting chopper circuit (3). Adversely, when output voltage ($V_{CH}$) of boosting chopper circuit (3) is lower than voltage ($V_{RC}$), PWM circuit (27) produces drive signal ($V_{G1}$) of wider on-pulse width to lengthen on-period of step-up switching element (5), thereby raising output voltage ($V_{CH}$) of boosting chopper circuit (3). In this way, the AC-DC converter can control on-period span of step-up switching element (5) in response to the level of output voltage ($V_{CH}$) of boosting chopping circuit (3) to maintain output voltage ($V_{CH}$) of boosting chopper circuit (3) at a generally consistent or fixed level while restraining fluctuation in output voltage ($V_{CH}$) of boosting chopper circuit (3) under wavering AC input voltage ($E_A$). Also, when step-up switching element (5) in boosting chopper circuit (3) is turned on under sufficiently high AC input voltage ($E_A$) from AC power source (1), AC input current ($I_A$) flows from AC power source 1 through rectification circuit (2), reactor (4) and step-up switching element (5) to accumulate electric energy in reactor (4). When step-up switching element (5) is turned from on to off, electric current flows from reactor (4) to capacitor (7) to electrically charge capacitor (7), and at the same time, AC input current ($I_A$) runs from AC power source (1) through rectification circuit (2), reactor (4) and capacitor (7). Even under low AC input voltage ($E_A$) from AC power source (1), AC input current ($I_A$) passes from AC power source (1), rectification circuit (2), reactor (4) and step-up switching element (5) during on-period of step-up switching element (5) to accumulate electric energy in reactor (4), and when step-up switching element (5) is switched from on to off, electric energy is forwarded from reactor (4) to capacitor (7), and concurrently AC input current ($I_A$) runs from AC power source (1) through rectification circuit (2), reactor (4) and capacitor (7). Thus, AC input current ($I_A$) always and continuously flows through boosting chopper circuit (3) in AC-DC converter throughout the entire cycle of AC input voltage ($E_A$) in sinusoidal waveform, while moving input power factor closer to 1 for its improvement. In addition, under a lighter mode of load (14), the converter can shorten on-period of main switching element (9), cutting down the period of one-sided polarity in voltage ($V_N$) on any winding in transformer (8), and then narrowing pulse width of output signal ($V_{CP1}$) from voltage detecting circuit (21). This works the converter into the condition inhibiting waveform shaper (23) from producing triangular wave signal ($V_{RC}$) of voltage reaching output voltage ($V_{CH}$) of boosting chopper circuit (3) to keep step-up switching element (5) in boosting chopper circuit (3) in the off condition. In this way, this ceases operation of boosting chopper circuit (3) to eliminate power consumption during light load period such as in standby condition of load (14).

EFFECT OF INVENTION

The converter according to the present invention can curb fluctuation in output voltage from boosting chopper circuit under the wavering AC input voltage to improve input power factor from AC voltage, and therefore, it can control or inhibit power loss of main switching element in DC-DC converter without need of large-sized transformer, while reining voltage distortion and concomitant harmonic noise which may occur in AC power source. Moreover, power consumption can be reduced during light load period, disabling operation of boosting chopper circuit.

EXPLANATION OF SYMBOLS (1) ... An AC power source, (2) ... A rectification circuit, (3) ... A boosting chopper (A boosting chopper circuit), (4) ... A reactor, (5) ... A boosting MOS-FET (A step-up switching element), (6) ... A rectification diode, (7) ... An intensifier capacitor, (8) ... A transformer, (8a) ... A primary winding, (8b) ... A secondary winding, (8c) ... An auxiliary winding, (9) ... A main MOS-FET (A main switching element), (10) ... A DC-DC converter, (11) ... A rectification smoothing circuit (A rectification smoother), (12) ... An output rectification diode, (13) ... An output smoothing capacitor, (14) ... A load, (15) ... An error amplifier, (16) ... A main control circuit, (17) ... A current detecting resistor, (18) ... A voltage-resonant capacitor, (21) ... A winding voltage detecting circuit (A voltage detector), (22) ... A polarity detecting comparator, (23) ... A waveform shaper, (24) ... An integral capacitor, (25) ... An integral resistor, (26) ... A discharge diode, (27) ... A PWM circuit, (28, 29) ... Dividing resistors, (30) ... A PWM comparator, (31) ... An overcurrent detecting circuit, (32) ... A normal power supply, (33) ... An overcurrent detecting comparator, (34) ... An AND gate, (50) ... A chopper control circuit, (51) ... An output voltage detecting circuit, (52) ... A phase compensating circuit, (53) ... An input voltage detecting circuit, (54) ... A multiplier, (55) ... A current detecting circuit, (56) ... A comparator, (57) ... An oscillator, (58) ... A drive circuit,

BEST MODE FOR CARRYING OUT THE INVENTION

An embodiment of the AC-DC converter according to the present invention is described hereinafter with reference to FIGS. 1 to 5 of the drawings. Same symbols are applied to substantially same parts in FIGS. 1 to 5 as those shown in FIGS. 6 and 7, and their explanation is omitted.

Figure 1:
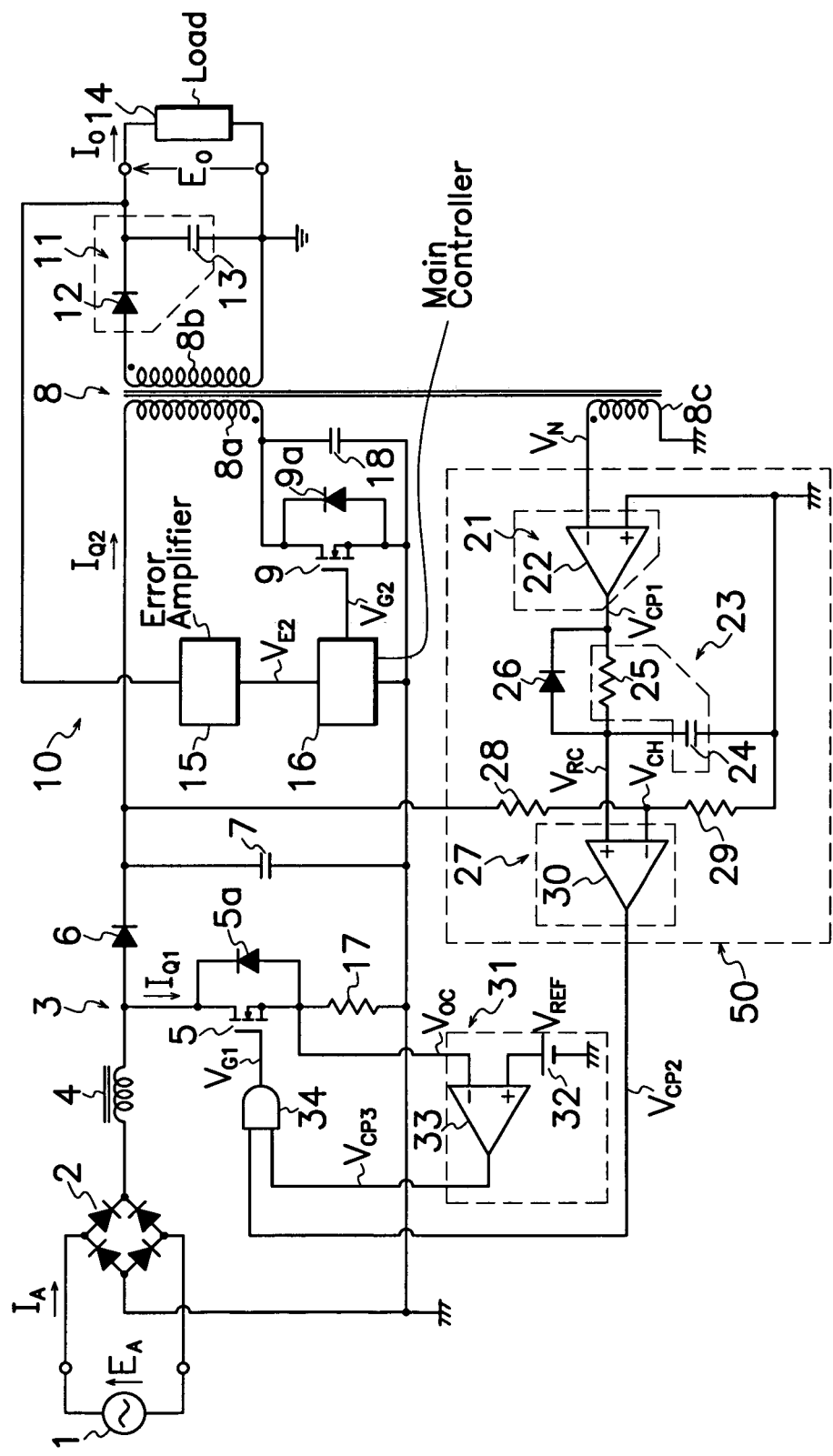
FIG. 1 An electric circuit diagram showing an embodiment of an AC-DC converter according to the present invention.
Figure 6:
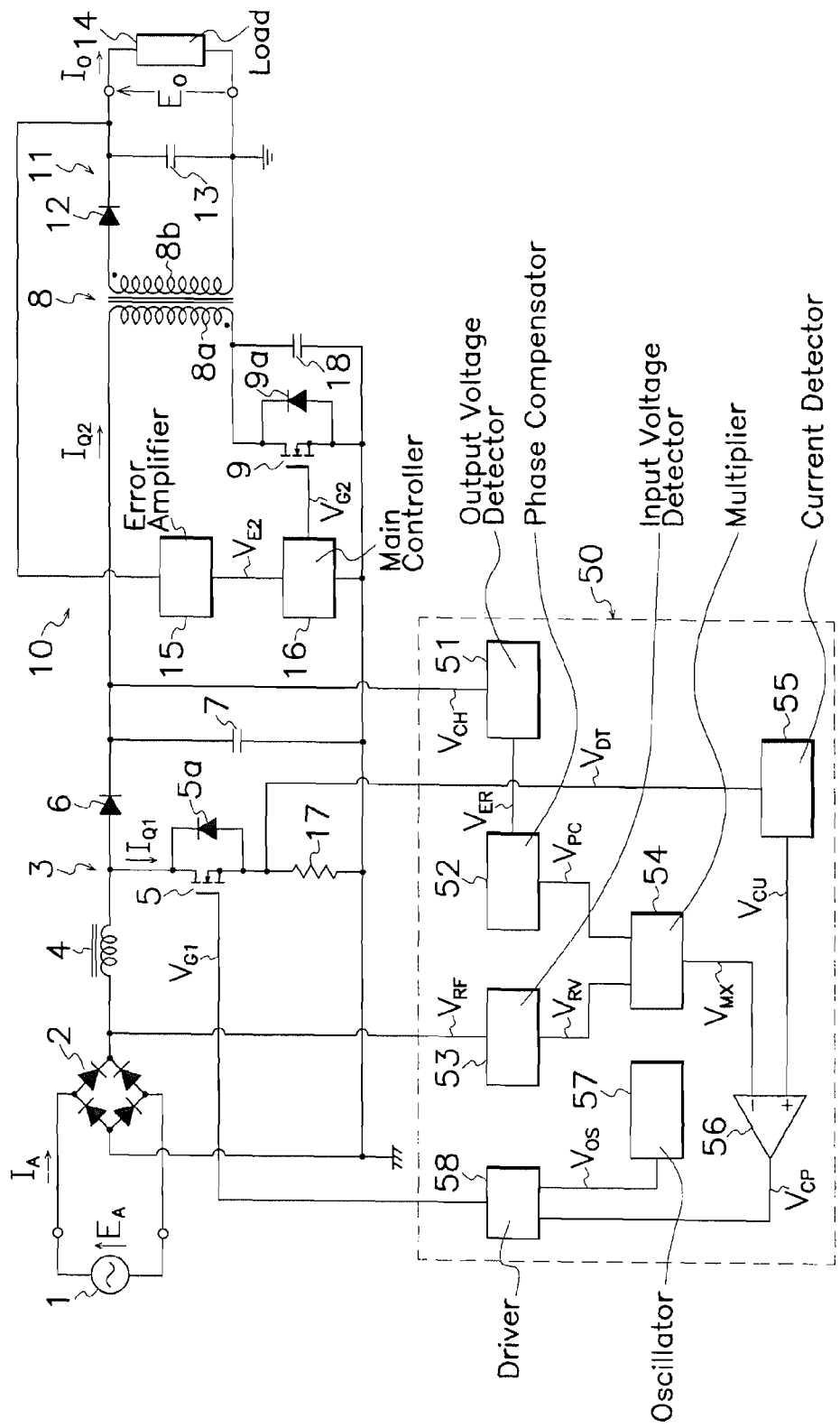
FIG. 6 An electric circuit diagram of a prior art AC-DC converter.
Figure 7:
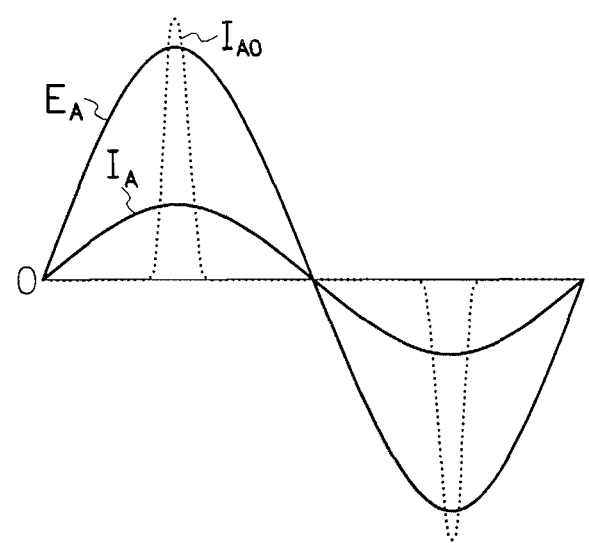
FIG. 7 A waveform chart showing variation in AC input voltage and AC input current in FIG. 6.

As shown in FIG. 1, the AC-DC converter according to the present embodiment comprises an auxiliary winding $8c$ in electro-magnetic coupling with primary winding $8a$ of transformer 8 shown in FIG. 6 in the adverse polarity, and a chopper control circuit (chopper controller) 50 connected to auxiliary winding $8c$. Chopper controller 50 comprises a winding voltage detecting circuit (winding voltage detector) 21 for detecting voltage $V_N$ appearing on auxiliary winding $8c$ by on-off operation of main MOS-FET 9 in DC-DC converter 10 to produce an output signal $V_{CP1}$ of high voltage level when auxiliary winding $8c$ produces one-sided or negative voltage $V_N$, a waveform shaper 23 for generating a linearly rising triangular wave signal $V_{RC}$ from output signal $V_{CP1}$ of winding voltage detector 21, voltage dividing resistors 28, 29 for splitting an output voltage from boosting chopper circuit 3, a PWM (Pulse Width Modulation) circuit 27 for comparing an output voltage $V_{RC}$ from waveform shaper 23 with divided voltage $V_{CH}$ on dividing resistor 29 to produce an output signal $V_{CP2}$ of high voltage level to one input terminal of an AND gate 34 when output voltage $V_{RC}$ of waveform shaper 23 exceeds divided voltage $V_{CH}$ on dividing resistor 29, an overcurrent detecting circuit (overcurrent detector) 31 for producing an output signal $V_{CP3}$ of low voltage level shown in FIG. 3 to the other input terminal of AND gate 34 when intensified current $I_{Q1}$ through boosting MOS-FET 5 in boosting chopper 3 exceeds a predetermined value, in other words when voltage $V_{OC}$ detected by current detecting resistor 17 comes to reference voltage $V_{REF}$, and an AND gate 34 for applying to a gate terminal of boosting MOS-FET 5 a first drive signal $V_{G1}$, namely a logical product signal of output signal $V_{CP2}$ from PWM circuit 27 and output signal $V_{CP3}$ from overcurrent detector 31. Each construction and operation of rectification circuit 2, boosting chopper 3 and DC-DC converter 10 are nearly the same as those in prior art AC-DC converter shown in FIG. 6.

Figure 2:
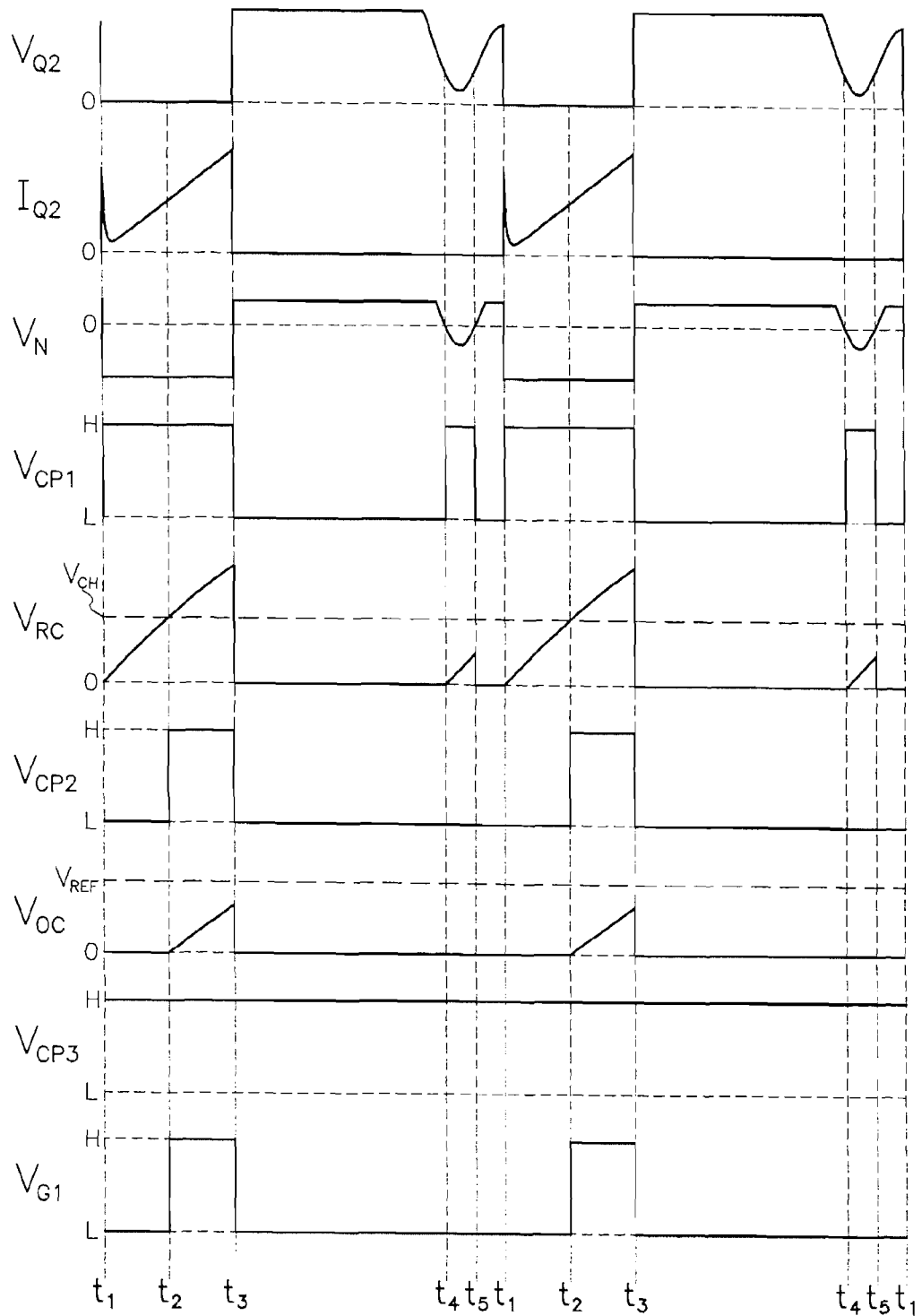
FIG. 2 A waveform chart showing variation in voltages and electric currents at selected locations in FIG. 1 under a normal load.
Figure 3:
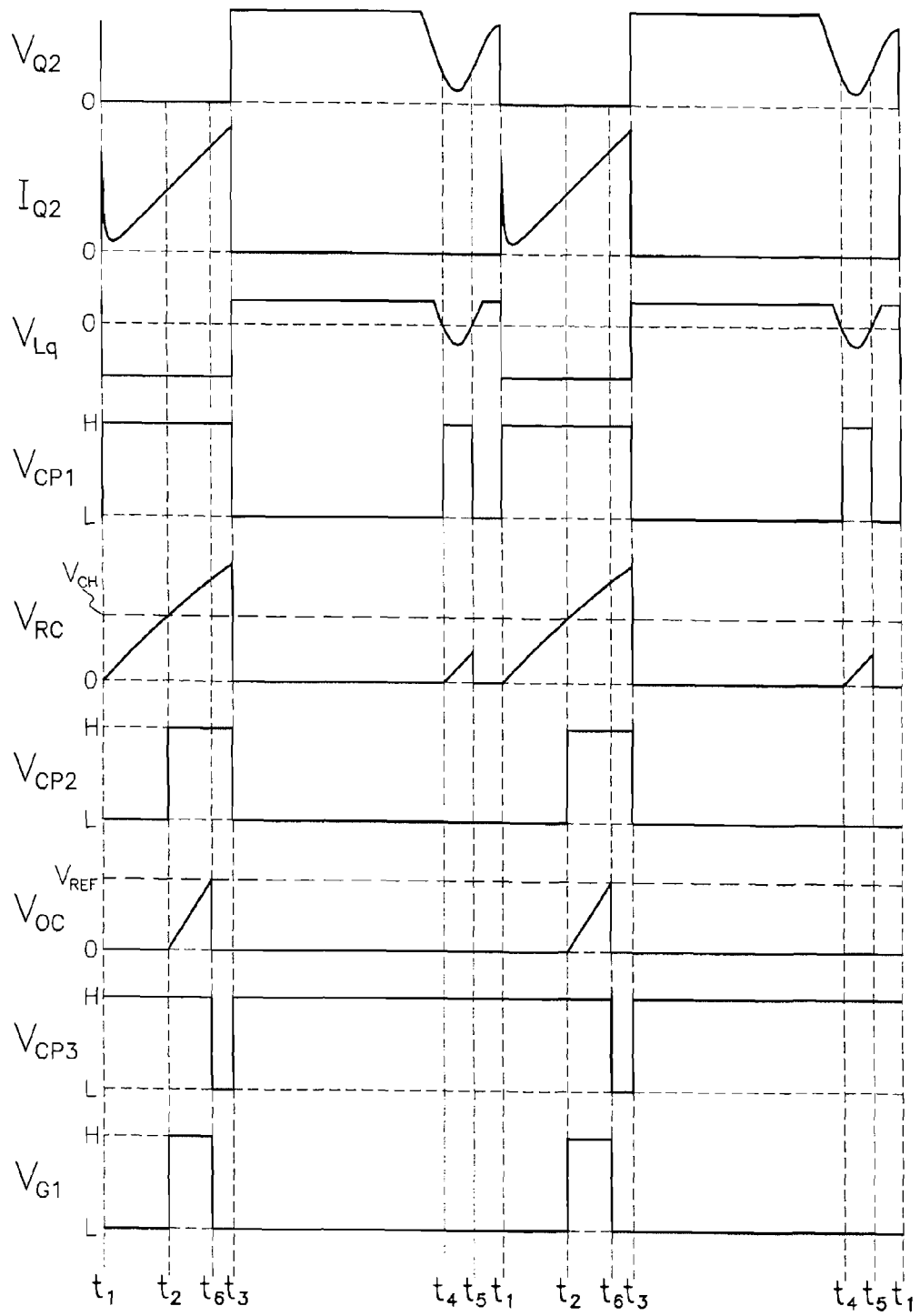
FIG. 3 A waveform chart showing variation in voltages and electric currents at selected locations in FIG. 1 under a heavy load.
Figure 4:
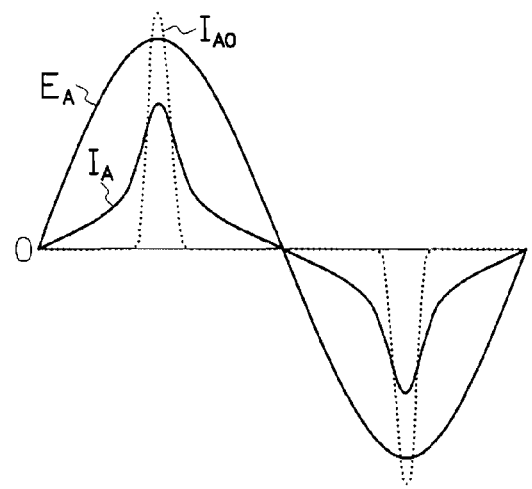
FIG. 4 A waveform chart showing variation in AC input voltage and AC input current in FIG. 1.
Figure 5:
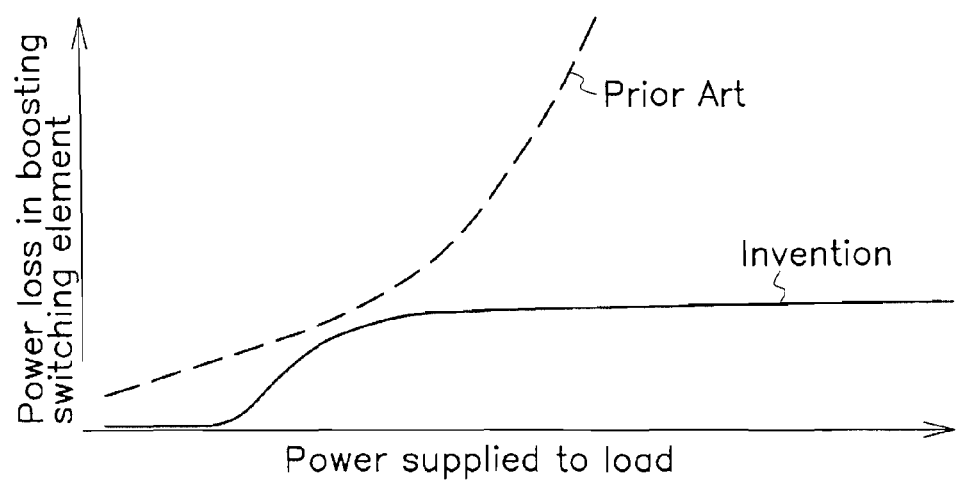
FIG. 5 A comparative graph showing power loss relative to power supplied to load in step-up switching elements of the invention's and prior art converters.

Winding voltage detector 21 comprises a polarity detecting comparator 22 for comparing voltage $V_N$ at the inverted input terminal connected to auxiliary winding 8c of transformer 8 and ground potential at the non-inverted input terminal to produce a rectangular signal $V_{CP1}$ of high voltage level shown in FIGS. 2 and 3 when auxiliary winding 8c of transformer 8 has voltage $V_N$ of negative polarity. Waveform shaper 23 comprises an integral resistor 25 one end of which is connected to an output terminal of polarity detecting comparator 22, an integral capacitor 24 connected between the other end of integral resistor 25 and ground, and a discharge diode 26 connected in parallel to integral resistor 25 to form an integration circuit of integral capacitor and resistor 24, 25 for integrating rectangular signal $V_{CP1}$ from winding voltage detector 21 to produce, from integral capacitor 24, linearly rising triangular signal $V_{RC}$ as a direct function shown in FIGS. 2 and 3. PWM circuit 27 comprises a PWM comparator 30 which has a non-inverted input terminal for receiving output voltage $V_{RC}$ from waveform shaper 23 and an inverted input terminal for receiving divided voltage $V_{CH}$ on dividing resistor 29 to compare output voltage $V_{RC}$ from waveform shaper 23 and divided voltage $V_{CH}$ on dividing resister 29. When output voltage $V_{RC}$ from waveform shaper 23 is higher and lower than divided voltage $V_{CH}$ on dividing resister 29, PWM comparator 30 produces an output signal $V_{CP2}$ of respectively high and low voltage level shown in FIGS. 2 and 3. An overcurrent detecting circuit (overcurrent detector) 31 comprises a normal power supply 32 for producing a reference voltage $V_{REF}$ to regulate a limited value of intensified current $I_{Q1}$ through boosting MOS-FET 5, and an overcurrent detecting comparator 33 which has the inverted input terminal for receiving a detected voltage $V_{OC}$ on current detecting resistor 17 and the non-inverted input terminal for receiving reference voltage $V_{REF}$ of normal power supply 32 to compare detected voltage $V_{OC}$ and reference voltage $V_{REF}$ and to produce an output signal $V_{CP3}$ of low voltage level when detected voltage $V_{OC}$ reaches reference voltage $V_{REF}$.

In operation of AC-DC converter shown in FIG. 1, when main MOS-FET 9 in DC-DC converter 10 is turned on at a point $t_1$ in time in FIG. 2 during off-period of boosting MOS-FET 5, a winding current $I_{Q2}$ flows from AC power source 1 through rectification circuit 2, reactor 4, rectification diode 6, primary winding 8a of transformer 8 and main MOS-FET 9 to accumulate electric energy in transformer 8. In this case, winding current $I_{Q2}$ induces a negative voltage $V_N$ shown in FIG. 2 on auxiliary winding 8c of transformer 8, and negative voltage $V_N$ is applied on inverted input terminal of polarity detection comparator 22 in winding voltage detecting circuit 21. Accordingly, polarity detection comparator 22 compares negative voltage $V_N$ with primary ground potential to produce a rectangular signal $V_{CP1}$ of high voltage level to waveform shaper 23 of integral resistor and capacitor 25, 24 which then integrates rectangular signal $V_{CP1}$ from polarity detection comparator 22 to produce a linearly rising triangular wave signal $V_{RC}$ shown in FIG. 2 from integral capacitor 24.

Waveform shaper 23 forwards its output signal $V_{RC}$ in triangular wave to non-inverted input terminal of PWM comparator 30 that compares voltage of triangular wave signal $V_{RC}$ with divided voltage $V_{CH}$ at junction between dividing resisters 28, 29. As shown in FIG. 2, when voltage $V_{RC}$ of triangular wave signal exceeds output voltage $V_{CH}$ of boosting chopper 3 at point $t_2$, PWM comparator 30 of PWM circuit 27 produces output signal $V_{CP2}$ of high voltage level to one input terminal of AND gate 34. On the other hand, as no intensified current $I_{Q1}$ flows through boosting MOS-FET 5 still kept off, and detection voltage $V_{OC}$ on current detecting resistor 17 is maintained zero volt lower than reference voltage $V_{REF}$ of normal power supply 32, overcurrent detecting comparator 33 produces output signal $V_{CP3}$ of high voltage level to the other input terminal of AND gate 34 to cause it to produce at point $t_2$ first drive signal $V_{G1}$ of high voltage level to boosting MOS-FET 5 which thereby is turned on at point $t_2$. Accordingly, intensified current $I_{Q1}$ passes from AC power source 1 through rectification circuit 2, reactor 4 and boosting MOS-FET 5 to linearly raise detection voltage $V_{OC}$ on current detecting resistor 17 as shown in FIG. 2.

When main MOS-FET 9 is turned from on to off at point $t_3$, winding current $I_{Q2}$ shown in FIG. 2 flowing through main MOS-FET 9 comes to approximately zero, and at the same time, electric energy stored in transformer 8 is discharged to produce DC output current $I_O$ from secondary winding 8b of transformer 8, output rectification diode 12 and output smoothing capacitor 13 of a rectification smoother 11 to a load 14. At this time, auxiliary winding 8c of transformer 8 switches emergent voltage $V_N$ from negative to positive polarity so that winding voltage detecting circuit 21 switches the output rectangular signal $V_{CP1}$ from high to low voltage level causing voltage of triangular signal $V_{RC}$ from waveform shaper 23 to lower to generally zero volt below split voltage $V_{CH}$ on dividing resistor 29 so that PWM comparator 30 switches output signal $V_{CP2}$ from high to low voltage level. On the other hand, as current detecting resistor 17 provides detection voltage $V_{OC}$ less than reference voltage $V_{REF}$, overcurrent detecting comparator 33 of overcurrent detector 31 maintains its output signal $V_{CP3}$ at a high voltage level. Thus, AND gate 34 switches first drive signal $V_{G1}$ from high to low voltage level to gate terminal of boosting MOS-FET 5 to shift it from on to off.

When release of energy from transformer 8 is completed immediately before point $t_4$, a ringing voltage occurs at each winding 8a to 8c of transformer 8, and it vibrates, as a sine wave, voltage $V_{Q2}$ shown in FIG. 2 between drain-source terminals of main MOS-FET 9 and also vibrates, as a sine wave, voltage $V_N$ on auxiliary winding 8c of transformer 8. During the time period from point $t_4$ to $t_5$, voltage $V_N$ appearing on auxiliary winding 8c of transformer 8 changes from positive to negative side to cause polarity detection comparator 22 to produce a rectangular signal $V_{CP1}$ at a high voltage level so that waveform shaper 23 linearly increases output voltage $V_{RC}$ from approximately zero volt into a triangular signal shape, however, as this triangular signal does not reach a divided voltage level $V_{CH}$ on dividing resistor 29 before time point $t_5$, thereby maintaining output signal $V_{CP2}$ of PWM comparator 30 at a low voltage level. In this case, a s approximately zero volt voltage is applied on current detecting resistor 17, overcurrent detecting comparator 33 still maintains output signal $V_{CP3}$ at a high voltage level. However, due to output signal $V_{CP2}$ of PWM comparator 30 retained at low voltage level, AND gate 34 still produces first drive signal $V_{G1}$ of low voltage level to gate terminal of boosting MOS-FET 5 to maintain it in off condition.

In the embodiment shown in FIG. 1, when load 14 is in the light condition, error amplifier 15 produces error signal $V_{E2}$ of high voltage level to cause main control circuit 16 to supply second drive signal $V_{G2}$ of narrower on pulse width to gate terminal of main MOS-FET 9 which therefore is turned on during shorter on-period. This shortens the negative period of voltage $V_N$ applied on auxiliary winding 8c of transformer 8 to cause polarity detecting comparator 22 to produce a rectangular narrower pulse signal $V_{CP1}$ of high voltage level, and therefore, although waveform shaper 23 produces a triangular signal $V_{RC}$ during on-period of main MOS-FET 9, voltage of triangular signal $V_{RC}$ does not reach divided voltage $V_{CH}$ on dividing resistor 29 to keep boosting MOS-FET 5 in off condition. This prevents operation of boosting chopper 3 during light load period, however, as a very small amount of AC input current $I_A$ flows through rectification circuit 2, reactor 4, rectification diode 6 and intensifier capacitor 7 to rectification circuit 2, AC input current $I_A$ contains harmonic current which may cause noise of negligibly small voltage level. Accordingly, power consumption during standby period of load 14 can be reduced by maintaining boosting MOS-FET 5 in off condition during light load period to stop operation of boosting chopper circuit 3.

In the embodiment shown in FIG. 1, when load 14 is heavy, winding current $I_{Q2}$ shown in FIG. 3 increasingly flows from AC power source 1 through rectification circuit 2, reactor 4, rectification diode 6, primary winding 8a of transformer 8 and main MOS-FET 9 to rectification circuit 2 during on-period of main MOS-FET 9. In this case, when boosting MOS-FET 5 is turned on at point $t_2$, an increased amount of intensified current $I_{Q1}$ flows from AC power source 1 through rectification circuit 2, reactor 4 and boosting MOS-FET 5 to rectification circuit 2, and when current detecting resistor 17 discerns a detection voltage $V_{OC}$ that reaches reference voltage $V_{REF}$ of normal power supply 32 at point $t_6$, overcurrent detecting comparator 33 switches output signal $V_{CP3}$ from high to low voltage level to cause AND gate 34 to shift first drive signal $V_{G1}$ from high to low voltage level, thus switching boosting MOS-FET 5 from on to off. Thus, during heavy load period, boosting MOS-FET 5 is forcibly turned from on to off at point $t_6$ before point $t_3$ at which main MOS-FET 9 is turned from on to off to lower output voltage from boosting chopper circuit 3, thereby controlling overcurrent flowing through reactor 4 and boosting MOS-FET 5 in boosting chopper circuit 3. In this way, even though increased electric power is supplied to load 14, resultant power loss can be controlled at a constant or substantially constant level by means of small-sized boosting MOS-FET 5 in boosting chopper circuit 3.

In this embodiment, waveform shaper 23 integrates a rectangular signal $V_{CP1}$ of winding voltage detector 21 to produce a triangular signal $V_{RC}$ which is compared with a divided voltage $V_{CH}$ on dividing resistor 29 in PWM comparator 30 of PWM circuit 27. In this case, when split voltage $V_{CH}$ is higher and lower than voltage level of triangular signal $V_{RC}$ of waveform shaper 23, PWM comparator 30 generates output signal of respectively narrower and broader pulse width so that AND gate 34 produces first drive signal $V_{G1}$ of respectively narrower and broader on-pulse width to more shorten and more elongate on-period of boosting MOS-FET 5 to respectively more reduce and more increase output voltage from boosting chopper circuit 3. In this way, the converter can maintain output voltage of boosting chopper 3 at a generally consistent or constant level by controlling on-period of boosting MOS-FET 5 in response to the level in output voltage from boosting chopper 3 to control fluctuation in output voltage of boosting chopper 3 depending on irregular AC input voltage $E_A$.

On the other hand, when boosting MOS-FET 5 is turned on under AC input voltage from AC power source 1 at a sufficiently high level, AC input current $I_A$ flows from AC power source 1 through rectification circuit 2, reactor 4 and boosting MOS-FET 5 to rectification circuit 2 while accumulating electric energy in reactor 4. Then, when boosting MOS-FET 5 is turned from on to off, electric energy is supplied from reactor 4 through rectification diode 6 to intensifier capacitor 7, and simultaneously AC input current $I_A$ runs from AC power source 1 through rectification circuit 2, reactor 4, rectification diode 6 and intensifier capacitor 7 to rectification circuit 2. Even under AC input voltage $E_A$ at a low level from AC power source 1, during on-period of boosting MOS-FET 5, AC input current $I_A$ flows from AC power source 1 through rectification circuit 2, reactor 4 and boosting MOS-FET 5 to rectification circuit 2 to store electric energy in reactor 4. When boosting MOS-FET 5 is turned from on to off, electric energy is supplied from reactor 4 through rectification diode 6 to intensifier capacitor 7, and concurrently, AC input current $I_A$ flows from AC power source 1 through rectification circuit 2, reactor 4, rectification diode 6 and intensifier capacitor 7 to rectification circuit 2. In this way, AC input current $I_A$ shown by a solid line in FIG. 4 always and continuously flows through boosting chopper 3 in AC-DC converter throughout the entire cycle of AC input voltage $E_A$ in sinusoidal wave while expanding the conduction angle of rectification circuit 2, at the same time improving input power factor moving closer to 1, and curbing voltage distortion and concomitant harmonic noise which may occur in AC power source 1.

Also, in this embodiment, during on-period of main MOS-FET 9, electric energy is accumulated in transformer 8, and during off-period of main MOS-FET 9, electric energy is released to the secondary side of transformer 8. After completion of energy release from transformer 8, each winding 8a to 8c produces ringing voltage which inverts the polarity of voltage $V_N$ appearing on auxiliary winding 8c of transformer 8 for a short period of time, during which waveform shaper 23 does not produce triangular signal $V_{RC}$ of its voltage level reaching divided voltage $V_{CH}$ on dividing resistor 29 to maintain boosting MOS-FET 5 in off condition. Accordingly, this prevents malfunction of boosting chopper 3 which can therefore stably be operated throughout any load condition.

The embodiment according to the present invention may be varied in various ways without limitation only to the foregoing embodiment. For example, the shown embodiment utilizes winding voltage detector 21 for detecting voltage $V_N$ appearing on auxiliary winding 8c of transformer 8, DC-DC converter 10 of flyback type, and MOS-FETs 5, 9 as step-up and main switching elements. Instead, winding voltage detector 21 may detect voltage appearing on any other winding (such as secondary winding 8b or tertiary winding) than auxiliary winding 8c. The converter may utilize a DC-DC converter of another forward, bridge or push-pull type and switching elements of another type, such as bipolar transistor of junction type or insulated gate type.

[Applicability of Invention in Industry]

The present invention is applicable to AC-DC converters which comprise a boosting chopper circuit for improving power factor in synchronization with operation of DC-DC converter.

What is claimed are:

1. An AC-DC converter comprising:
a rectification circuit (2) for commutating an AC voltage ($E_A$) from an AC power source (1), a boosting chopper circuit (3) that comprises at least a reactor (4) connected to an output terminal of the rectification circuit (2), a step-up switching element (5) connected in series to the reactor (4) and a capacitor (7) connected in series to the reactor (4) and also in parallel to the step-up switching element (5) for increasing an output voltage from the rectification circuit (2) through the reactor (4) by on-off operation of the step-up switching element (5),
a DC-DC converter (10) that comprises a primary winding (8a) of a transformer (8) connected to the boosting chopper circuit (3) and at least one main switching element (9) for producing a DC voltage ($E_O$) to a load (14) through a rectification smoother (11) connected to a secondary winding (8b) of the transformer (8) by on-off operation of the main switching element (9), a voltage detecting circuit (21) for detecting a voltage ($V_N$) appearing on any winding of the transformer (8) by on-off operation of the main switching element (9) in the DC-DC converter (10) to produce an output signal ($V_{CP1}$) when the voltage ($V_N$) on any winding has one polarity, a waveform shaper (23) for generating chopping signals ($V_{RC}$) from the output signal ($V_{CP1}$) of the voltage detecting circuit (21), and a PWM circuit (27) for comparing an output voltage ($V_{RC}$) from the waveform shaper (23) and output voltage ($V_{CH}$) from the boosting chopper circuit (3) to supply drive signals ($V_{G1}$) to the step-up switching element (5) in the boosting chopper circuit (3) when the output voltage ($V_{RC}$) from the waveform shaper (23) exceeds the output voltage ($V_{CH}$) from the boosting chopper circuit (3), wherein during a shorter on-period of the main switching element (9) under a light mode of the load (14), the DC-DC converter (10) inhibits the waveform shaper (23) from producing a triangular wave signal ($V_{RC}$) of voltage reaching the output voltage ($V_{CH}$) of the boosting chopper circuit (3) to keep the step-up switching element (5) in the boosting chopper circuit (3) in the off condition.

2. The AC-DC converter of claim 1, further comprising an auxiliary winding (8c) in said transformer (8) electrically connected to said voltage detecting circuit (21), wherein said step-up switching element (5) is turned from off to on when said PWM circuit (27) produces the drive signal ($V_{G1}$), and said step-up switching element (5) is turned from on to off when the polarity of the voltage ($V_N$) generated on the auxiliary winding (8c) of said transformer (8) is inverted.

3. The AC-DC converter of claim 2, wherein said step-up switching element is turned from off to on when said PWM circuit produces the drive signal, and said step-up switching element is turned from on to off when the polarity of the voltage generated on the auxiliary winding of said transformer is inverted.

4. The AC-DC converter of any one of claim 3, 1, or 2, further comprising an overcurrent detecting circuit for turning said step-up switching element off to confine the output voltage from the boosting chopper circuit when boosting electric current through the step-up switching element in said boosting chopper circuit exceeds a predetermined value.

* * * * *